US008117541B2

(12) United States Patent
Sandige et al.

(10) Patent No.: US 8,117,541 B2
(45) Date of Patent: Feb. 14, 2012

(54) RENDERING OF TWO-DIMENSIONAL MARKUP MESSAGES

(75) Inventors: Michael Sandige, Sammamish, WA (US); Gary W. Hinger, II, Redmond, WA (US)

(73) Assignee: WildTangent, Inc., Redmond, WA (US)

( * ) Notice: Subject to any disclaimer, the term of this patent is extended or adjusted under 35 U.S.C. 154(b) by 1092 days.

(21) Appl. No.: 11/958,199

(22) Filed: Dec. 17, 2007

(65) Prior Publication Data
US 2008/0222503 A1 Sep. 11, 2008

Related U.S. Application Data

(60) Provisional application No. 60/893,247, filed on Mar. 6, 2007.

(51) Int. Cl.
*G06F 17/00* (2006.01)

(52) U.S. Cl. ........................................ 715/273

(58) Field of Classification Search .................. 715/234, 715/273
See application file for complete search history.

(56) References Cited

U.S. PATENT DOCUMENTS

| 5,798,770 | A  | * | 8/1998  | Baldwin ................... 345/506 |
| 6,297,814 | B1 |   | 10/2001 | Masuda et al. |
| 6,597,357 | B1 | * | 7/2003  | Thomas .................... 345/426 |
| 6,714,810 | B2 | * | 3/2004  | Grzeszczuk et al. ...... 600/427 |
| 7,489,318 | B1 | * | 2/2009  | Wilt ......................... 345/582 |
| 7,827,485 | B2 | * | 11/2010 | Bourdev ................... 715/274 |
| 8,000,768 | B2 | * | 8/2011  | Zhao et al. ................ 600/410 |
| 2002/0135587 | A1 | * | 9/2002 | Cunniff ..................... 345/545 |
| 2002/0150307 | A1 | * | 10/2002 | Hamburg .................. 382/282 |
| 2003/0107580 | A1 |   | 6/2003  | Egawa et al. |
| 2004/0070582 | A1 | * | 4/2004  | Smith et al. ............... 345/419 |
| 2004/0160456 | A1 | * | 8/2004  | Steele et al. .............. 345/612 |
| 2005/0017982 | A1 | * | 1/2005  | Kane, Jr. ................... 345/582 |
| 2005/0022139 | A1 |   | 1/2005  | Gettman |
| 2005/0116946 | A1 |   | 6/2005  | Chung |
| 2005/0119555 | A1 | * | 6/2005  | Fritz et al. ................ 600/410 |
| 2005/0207647 | A1 | * | 9/2005  | Maeda ...................... 382/182 |
| 2005/0234946 | A1 | * | 10/2005 | Woo et al. ................. 707/100 |
| 2006/0028468 | A1 |   | 2/2006  | Chen et al. |
| 2006/0046844 | A1 | * | 3/2006  | Kaneko ...................... 463/32 |

(Continued)

FOREIGN PATENT DOCUMENTS
WO 9904371 7/1999

(Continued)

OTHER PUBLICATIONS

Sawhney et al., Video Flashlights—Real Time Rendering of Multiple Videos for Immmerse Model Visualization, ACM 2002, pp. 157-168.*

(Continued)

*Primary Examiner* — Cong-Lac Huynh

(74) *Attorney, Agent, or Firm* — Schwabe, Williamson & Wyatt, P.C.

(57) ABSTRACT

Embodiments of the present invention provide methods, systems, and apparatuses configured to receive or retrieve markup data associated with a message formatted for two-dimensional (2D) rendering, virtually render, by a first rendering module, the message in a non-displayed image in accordance with the markup data, and render, by a second rendering module, a three-dimensional (3D) object in a 2D display environment including texturing the non-displayed image on a surface of the 3D object in order to render the message. Other embodiments are also described.

23 Claims, 9 Drawing Sheets

U.S. PATENT DOCUMENTS

| | | |
|---|---|---|
| 2006/0082578 A1* | 4/2006 | Ohbuchi .................... 345/426 |
| 2006/0087556 A1* | 4/2006 | Era ............................ 348/51 |
| 2006/0105841 A1 | 5/2006 | Rom et al. |
| 2006/0119599 A1* | 6/2006 | Woodbury ................. 345/420 |
| 2006/0262132 A1* | 11/2006 | Cochran .................... 345/592 |
| 2007/0098290 A1* | 5/2007 | Wells ........................ 382/254 |
| 2007/0211170 A1* | 9/2007 | Ramaswamy et al. ..... 348/552 |
| 2007/0291120 A1* | 12/2007 | Campbell et al. .......... 348/162 |
| 2008/0079718 A1* | 4/2008 | Woo ........................... 345/419 |
| 2008/0094395 A1* | 4/2008 | Woo et al. ................. 345/422 |
| 2008/0165190 A1* | 7/2008 | Min et al. .................. 345/421 |
| 2009/0079759 A1* | 3/2009 | Steele et al. ............... 345/612 |
| 2009/0091586 A1* | 4/2009 | Kosako et al. ............. 345/670 |
| 2009/0123045 A1* | 5/2009 | Quadling et al. .......... 382/128 |
| 2010/0201695 A1* | 8/2010 | Hill et al. .................. 345/503 |

FOREIGN PATENT DOCUMENTS

| | | |
|---|---|---|
| WO | 0157643 A1 | 8/2001 |
| WO | 2004051396 A2 | 6/2004 |
| WO | WO 2005/086969 A2 | 9/2005 |
| WO | 2006031381 A2 | 3/2006 |
| WO | WO 2006/071246 A1 | 7/2006 |
| WO | WO 2006/105660 A1 | 10/2006 |
| WO | WO 2006/122411 A1 | 11/2006 |

OTHER PUBLICATIONS

Grossman et al., Multi-Finger Gestural Interaction with 3D Volumetric Displays, ACM 2004, pp. 61-70.*

Gross et al., blue-c: A Spatially Immersive Display and 3D Video Portal for Telepresence, ACM 2003, pp. 1-9.*

McGaughey et al., Fusing Lidar Data, Photographs, and Other Data Using 2D and 3D Visualization Techniques, Google 2003, pp. 1-9.*

Khan et al., Image-Based Material Editing, ACM 2006, pp. 654-663.*

Supplementary European Search Report, mailed Aug. 12, 2010 for application No. 07865799.6.

Kim Pallister: "Rendering to Texture Surfaces Using DirectX 7" Nov. 12, 1999, Retrieved from Internet: URL: http://www.gamasutra.com/features/19991112/pallister_01.htm>.

* cited by examiner

RENDERING OF TWO-DIMENSIONAL MARKUP MESSAGES

CROSS REFERENCE TO RELATED APPLICATIONS

This application claims the benefit of U.S. Provisional Application No. 60/893,247, filed Mar. 6, 2007.

TECHNICAL FIELD

Embodiments of the present invention relate to the field of computer science. In particular to virtually rendering two-dimensional markup messages and texturing them onto three-dimensional objects of a display environment.

BACKGROUND

Advertisements are commonly found on web-pages utilizing both HTML and advertisement graphics and significant infrastructure exists to support web-page advertising. Existing technology and infrastructure for web-page advertising includes tools for scheduling (programming) web-page advertisements and web-page advertisement campaigns, tools for geographic targeting of advertisements using IP addresses or other identifiers, tracking technology to count the number of times an advertisement is placed on a web-page (i.e. the number of "impressions"), display technologies for scripting and streaming content into web-pages to optimize advertisement presentation, and tools for creating web-page advertisements. There is also an existing base of developers experienced at creating web-page presentation material for web-page advertising (e.g. "creative types").

Additionally, there are existing business and economic models for assessing the value of an advertisement based on impression count or the number of times an advertisement is delivered to an end-user. HTML is a well-defined data format that describes the presentation of visual materials and is the primary format used by Web Browsers to receive the information that they use to show ('render') a web-page. It is a rich format that is relatively difficult to properly render and display.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF EMBODIMENTS

Figure 1:
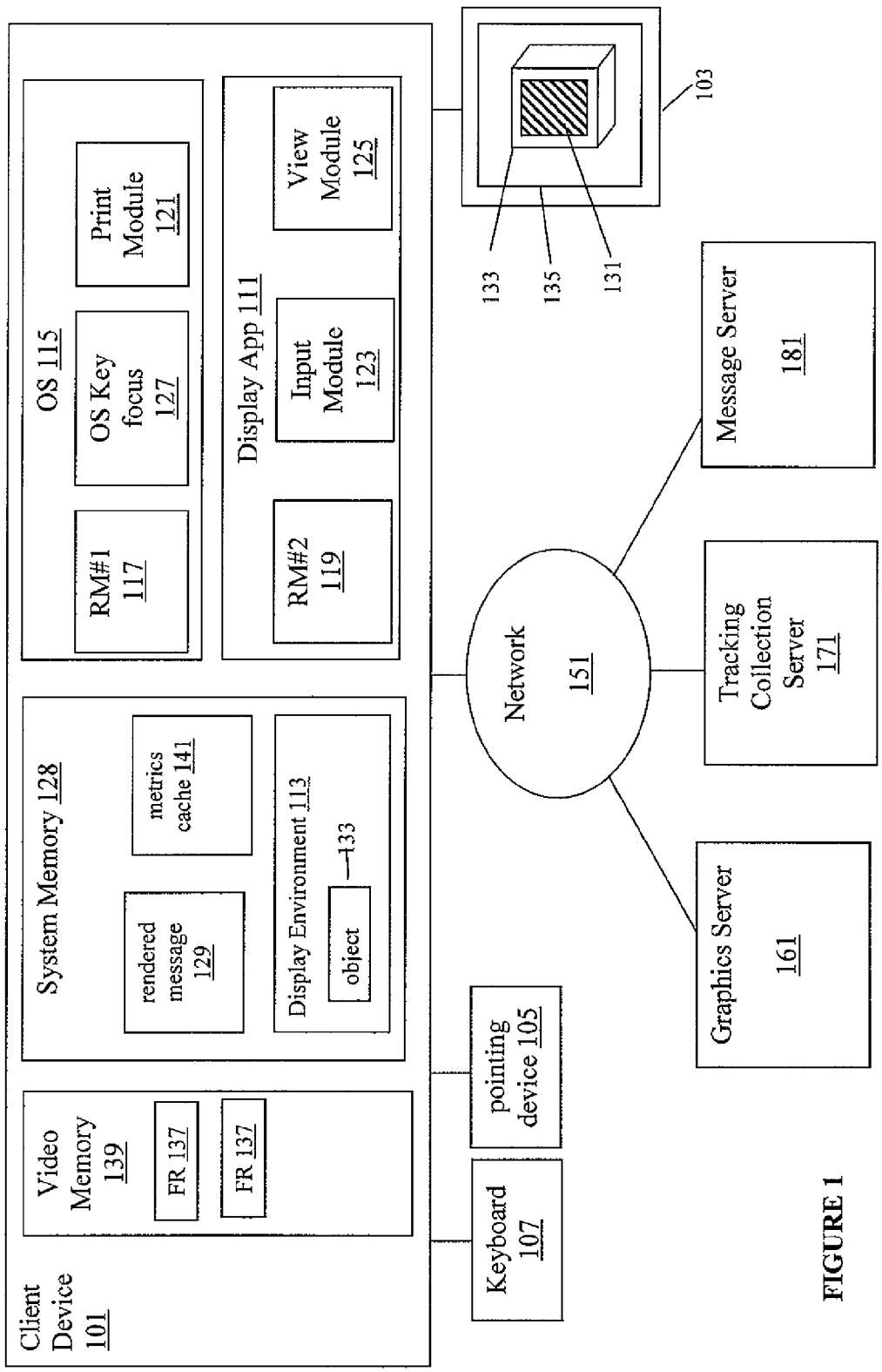
FIG. 1 illustrates an overview of a system configured to deliver, render, and texture messages, formatted in markup language for rendering within a 2D display window, onto 3D objects of a 2D display environment according to embodiments.

References are made in the following detailed description to the accompanying drawings that are part of the disclosure and which illustrate embodiments. Other embodiments may be utilized and structural or logical changes may be made without departing from the scope of the disclosure. Therefore, the following detailed description and accompanying drawings are not to be taken in a limiting sense, and the scope of embodiments is defined by the appended claims and equivalents.

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary.

The description may use perspective-based descriptions such as up/down, back/front, and top/bottom. Such descriptions are merely used to facilitate the discussion and are not intended to restrict the scope of embodiments.

The terms "coupled" and "connected," along with their derivatives, may be used. These terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments, are synonymous.

Embodiments may provide methods, apparatuses, and systems configured to texture messages formatted in a markup language for display in a two-dimensional (2D) window onto three-dimensional (3D) objects of a 2D display environment. Embodiments may also provide methods, apparatuses, and systems configured to track on-screen user input information associated with on-screen textured messages and convert it for use with input module(s) configured for tracking user input associated with a virtually-rendered non-displayed message formatted in markup language for display in a 2D window. Embodiments may also provide methods, apparatuses, and systems configured to track and report metrics related to the viewability of on-screen messages textured onto 3D objects of a 2D display environment. In exemplary embodiments, a computing system may be endowed with one or more components of the disclosed apparatuses and/or systems and may be employed to perform one or more methods as disclosed herein.

Embodiments may utilize existing web-page delivery infrastructure to serve messages and/or advertisements within display environments that include 3D objects. Such display environments may be, for example, a computer-implemented game. Such messages may be formatted using markup language such as, for example, HTML or other markup language. Such messages may include graphics. One advantage of using HTML and/or other markup languages for in-game advertisement/message delivery may be the ability to utilize existing infrastructure and technologies for delivering messages including web-page advertisements.

This technique may allow the texturing of virtually-rendered non-displayed messages formatted in markup language for display in 2D windows onto arbitrary 2D or 3D objects of a display environment, such as the display environment of a computer-implemented game. This technique may also be applicable beyond games to any application with a display environment that would benefit from a seamless integration of HTML presentation—or other markup language—for advertisements or other messages.

Typically, web-pages may be retrieved in HTML format from a web server. The HTML data may include, in addition to any content on the page, messages from third parties such as advertisements. The messages may be encoded with size and position markers to reserve space in the web-page for the advertisement graphics as well as embedded addresses such as, for example, Uniform Resource Locators (URLs) from which the server may access and retrieve the graphics for the advertisement. Embodiments of the present invention may take HyperText Markup Language (HTML) formatted data and, instead of rendering it in a flat two-dimensional (2D) window such as in an ordinary browser, it may virtually render the HTML into a non-displayed image. The non-displayed message may then be textured onto the surface of a 3D object in a 2D display environment in a typical way that three-dimensional (3D) objects are rendered. Alternatively, it may be drawn to the screen in the normal way that 2D objects are drawn.

FIG. 1 illustrates an overview of a system configured to deliver, render, and texture messages formatted in markup language for rendering within a 2D display window onto 3D objects of a 2D display environment according to embodiments. Client device 101 may include display device 103, pointing device 105, and/or keyboard 107, coupled to each other as shown. Client device 101 may include display application 111 which may generate display environment 113.

Display environment 113 may include one or more objects—such as object 133—generated by display application 111 for possible display during execution of display application 111. Display environment 113 may also include orientation information for objects—such as object 133—and other graphical details for display. Display application 111 may be configured to create display frames 137 using some or all of the generated objects, graphical details, and/or orientation information of display environment 113. Display environment 113 may be stored in system memory 128 or other memory. Display frames 137 may be temporarily stored in video memory 139, or in other memory such as system memory 128.

Display application 111 may be, in embodiments, any software or hardware-based application that renders 2D graphical displays for display on display device 103. In embodiments, a 2D graphical display may include one or more 3D objects. As used herein, a "graphical display environment" may be described as being 2D, even though 3D objects may be displayed within them. The display embodiment may be considered 2D because it is displayed on a 2D viewing surface such as on a monitor, LCD display, television, or other substantially 2D display screen such as display screen 135 of display device 103. As used herein, objects described as 3D objects may be considered 3D objects because they may include perspective or otherwise appear to be 3D to a human viewer when displayed on a 2D display screen, such as display screen 135. Such objects may also be described in three dimensions within display environment 113 such that, as display application 111 displays different scenes during execution, various aspects of the objects may be displayed from one display frame to another. As an example, where display application 111 is a computer-implemented game, a user may move within a virtual world and view various sides and angled views of objects within display environment 113. Thus, even though the objects may be displayed on a 2D screen, the objects themselves may have 3D characteristics.

In embodiments, display application 111 may be a computer-implemented game. In embodiments, it may be any interactive or non-interactive audio-visual display application. In embodiments, display application 111 and display environment 113 may be configured to execute within a run-time environment provided by operating system 115. In embodiments where display application 111 is an interactive application—such as for example a computer-implemented game—display environment 113 may constitute the visible portion of an interactive experience of display application 111. In embodiments where display application 111 is a computer-implemented game, display environment 113 may constitute a portion of the visible aspects of a "virtual world" achieved by the computer-implemented game.

Client device 101 may contain first rendering module 117 configured to render markup documents formatted in a markup language for display in a 2D window, such as a web-browser or other application. Client device 101 may include second rendering module 119. In embodiments, second rendering module 119 may be included within display application 111. In other embodiments, second rendering module 119 may be implemented as a separate component of client 101.

In embodiments, first rendering module 117 may be a component of operating system 115 or a separate component within client device 101. In embodiments where operating system 115 is one of a variety of Microsoft Windows operating systems, first rendering module 117 may be a standard Windows component such as, for example, MSHTML or other component. In embodiments, client device 101 may be configured to operate first rendering module 117 so that it virtually renders a message formatted in markup language for display in a 2D window to a non-displayed window, such as virtually-rendered non-displayed image 129 stored in system memory 128 or other memory. In embodiments, first rendering module 117 may be configured to virtually render messages formatted in markup language for display in a 2D window to virtually rendered non-displayed image 129 for another purpose, such as for example, printing. In such embodiments, first rendering module 117 may be configured to cooperate with destination module 121. In embodiments, destination module 121 may be, for example, a print module. In embodiments, second rendering module 119 may be configured to capture non-displayed image 129 for further processing and/or alteration(s). In embodiments, second rendering module may be configured to emulate destination module 121 in order to cooperate with first rendering module 117 and capture non-displayed image 129 virtually rendered by first rendering module 117.

In embodiments, display application 111 may be configured to request a markup document from message server 181 via network 151. Network 151 may include one or more of wireless and/or wired segments. Network infrastructure 151 may include the Internet or other wide-area network. Embodiments are not limited to any particular network infrastructure topologies. Message server 181 may be configured to retrieve, generate, and/or return one or more message documents formatted in markup language for display in a 2D window in response to the request. The one or more message documents may include one or more messages—such as advertisements—encoded in the typical way, such as, for example, a locator reference—such as a Universal Resource Locator (URL)—to the advertisement or advertisement graphic located on graphics server 161 or a separate server (not shown) to be retrieved separately.

In embodiments, multiple instances of rendering module 117 may be executed to virtually render multiple markup messages. In embodiments, the number of concurrently executing instances of rendering module 117 may be limited in practice by the computing resources available. This may result, in embodiments, in a greater number of markup messages requiring virtual rendering than available instances of rendering module 117. Also, in embodiments, markup messages may be virtually re-rendered at periodic intervals such as for example, if the markup message is designed to be animated. To address these issues, embodiments of rendering module 117 may be configured to, at periodic intervals, sequentially process multiple messages in a circular, round-robin, or other fashion in order to keep up-to-date a greater number of virtually-rendered markup messages. In embodiments, rendering module 117 may be configured to virtually render a markup message less frequently depending on various factors. In embodiments, markup messages that are to be textured onto 3D objects that appear very small on a display and/or are out of view may be virtually re-rendered less frequently and/or with less detail than markup messages that are to be textured onto 3D objects that are relatively large and/or that are more fully in view. This may be dynamically applied such that markup messages may be virtually re-rendered more frequently as the object they are textured onto becomes larger or more visible during execution.

Display application 111 or second rendering module 119 may be configured to cause first rendering module 117 to virtually render the contents of the received message, including in embodiments retrieving one or more graphics from graphics server 161 and/or one or more messages from a separate server (not shown). As described above, the resulting virtually-rendered image may be virtually-rendered non-displayed image 129. In embodiments, second rendering module 119 may be configured to capture virtually-rendered non-displayed image 129 and texture it onto a surface of object 133 within display environment 113. In embodiments, object 133 may be a 3D object. As used herein "texturing" means altering a virtually-rendered image—such as virtually-rendered non-displayed image 129—so that it can be displayed on a surface of a 2D or 3D object within a display environment, such as for example object 133. In embodiments, such altering may include shrinking, enlarging, stretching, skewing, morphing, and/or performing other modification(s) to the virtually-rendered image so that the virtually-rendered image fits onto the surface of an object. In embodiments, second rendering module 119 may be configured to apply translucency and/or transparency to non-displayed image 129 as part of texturing it onto a surface of object 133. This will be described more fully below. Once textured onto object 133, the image may appear to be part of the surface of object 133. When a particular angled view of object 133 is displayed, the virtually-rendered/textured image will appear with the same angled view such that the image may be offset, skewed, and/or partially or wholly blocked by other objects within display environment 113. In short, it may appear to be as much of a part of display environment 113, as any other graphical detail or object.

In embodiments, graphics server 161 may be configured to serve graphics, such as for example advertisement graphics, formatted and configured for inclusion within an image formatted using markup language for display within a 2D window. In embodiments, display application 111—in conjunction with first and second rendering modules 117 and 119—may be configured to render, texture, and display such images onto a surface of object 133 of display environment 113. In embodiments, such markup languages may be HTML, XML, XHTML, or other. Embodiments are not limited to any particular set of markup languages or formatting. By being configured to request a markup document from message server 181 and by being configured to retrieve graphics from graphics server 161, display application 111 may also be configured to display images within display environment 113 by utilizing existing Internet-based infrastructure for displaying images, in particular existing infrastructure for serving web-based advertisements.

Client device 101 may include input module 123 configured to track input signals from input devices such as pointing device 105 or keyboard 107. As described in more detail below, input module 123 may be configured to determine when a pointer controlled by pointing device 105 points to virtually-rendered/textured image 131 displayed on display device 103. In embodiments, input module 123 may be configured to translate pointing device coordinates of the textured/rendered image to a coordinate system of virtually-rendered non-displayed image 129 to allow input controls associated with virtually-rendered non-displayed image 129 to determine if an on-screen pointer points to a user input field or clickable link within the virtually-rendered image and/or to process user input as if the user were interacting directly with virtually-rendered non-displayed image 129. In embodiments, input module 123 may include an environmental keyboard focus module configured to track keyboard focus of textured image 131. Keyboard focus may refer to a determination of the input field within virtually-rendered image 129—if any—that is to receive input from keyboard 107. In embodiments, OS keyboard focus module 127 may be configured to track keyboard focus within virtually-rendered non-displayed image 129. In embodiments, the environment keyboard focus module may be configured to separately track keyboard focus within rendered/textured image 131 and to translate that keyboard focus to and from the keyboard focus of non-displayed image 129 for appropriate processing by OS keyboard focus module 127 as if the user were entering input directly into user input fields of virtually-rendered non-displayed image 129. In this way, in embodiments, existing modules for handling pointing and/or user input directed towards messages formatted in markup language for display in a 2D window—such as for example HTML documents—may be utilized.

Client device 101 may include, in embodiments, viewability-tracking module 125 configured to track and report metrics relating to the viewability of textured image 131. Viewability-tracking module 125 may be configured to report viewability metrics to message server 181 or other server as described in more detail below. In embodiments, viewability-tracking module 125 may be included as a part of display application 111.

It may be desirable in embodiments to maintain the look and feel of display environment 113 if the requested messages are not available either because client device 101 may be running without a network connection or because of a network or server failure. Embodiments may use a set of fallback offline placeholder ads that may be used if the requested messages are not available.

A message display policy may be used in accordance with embodiments. A message display policy may be a policy that governs when a message should be shown such as, for example, at a certain time during the execution of display application 111. Examples include policies to always show the message or to show the message only when the display application has not been purchased, among others.

In embodiments, images may be placed into display environment 113 in a way that does not impact the look and feel of display environment 113. In embodiments, images may be optionally skipped.

The policy for determining if and when messages should be shown may in embodiments be programmed directly into the display application. In other embodiments, the policy may be changed dynamically by retrieving a new policy from message server 181 or other server.

In embodiments, a dynamic policy may encode rules, such as message display frequency information. In embodiments, the available policies may be encoded in files that may be stored on message server 181 along with messages, and so may be served and maintained as if they are themselves messages, using the existing message-serving technology and infrastructure. Using the existing message-serving technology and infrastructure may allow the policies to be dynamic, easily accessed and updated. In embodiments, different policies may be targeted to different geographic areas. In embodiments, policies may be associated with advertisement campaigns.

Figure 2:
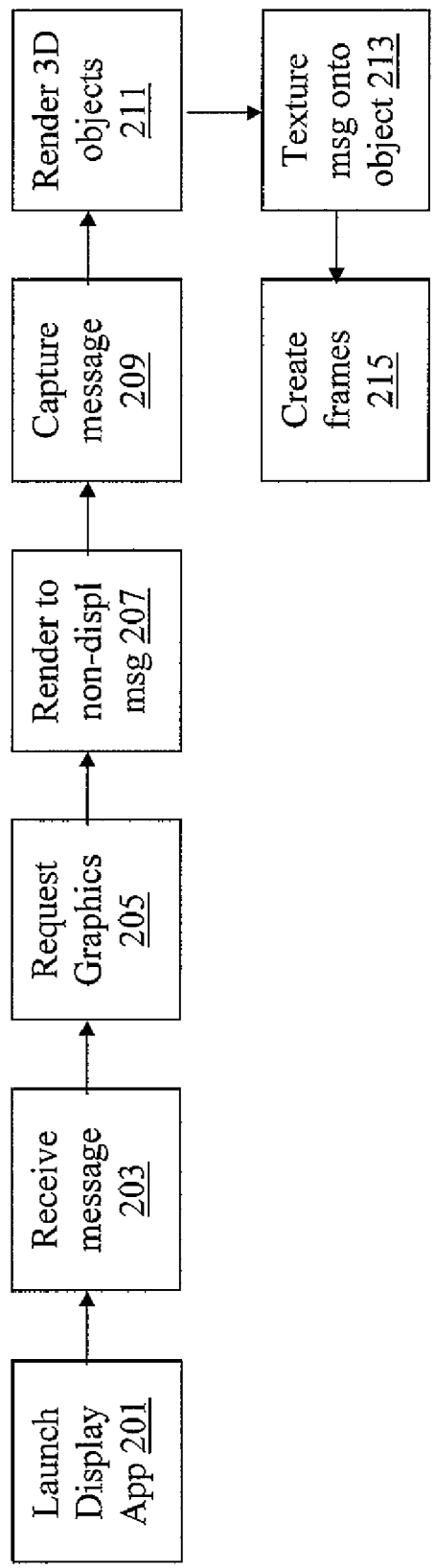
FIG. 2 illustrates a method for delivering, rendering, and texturing messages, formatted in markup language for rendering within a 2D display window, onto 3D objects of a 2D display environment according to embodiments.

FIG. 2 illustrates a method for delivering, rendering, and texturing messages, formatted in markup language for rendering within a 2D display window, onto 3D objects of a 2D display environment according to embodiments. The process may begin by launching a display application—such as for example display application 111 of FIG. 1—block 201. The display application may request and receive a message formatted in markup language for rendering within a 2D display window block 203. In embodiments, the received message may include references such as for example a Universal Resource Locator (URL), or other identifying information, for retrieving message graphics for inclusion within the received message. In these embodiments, the display application may request and receive the referenced graphic(s) block 205. A first rendering module—such as for example first rendering module 117 of FIG. 1—may virtually render the received message including the received message graphics according to the markup language format of the received message block 207. In embodiments, the message may be virtually rendered as a non-displayed image such as for example non-displayed image 129 of FIG. 1. In embodiments, the message may be virtually rendered into a non-displayed window. A second rendering module—for example second rendering module 119 of FIG. 1—may capture the virtually-rendered image block 209. Display application may render one or more 3D objects—such as object 133 of FIG. 1—into a display environment—such as display environment 113 of FIG. 1—block 211. Second rendering module may then texture the non-displayed image onto a surface of one or more objects within the display environment block 213.

The display application may then, in embodiments, create and display frames using the objects and other information contained within the display environment block 215. In embodiments, the created display frames may be created according to a state of execution of the display application. In embodiments, one or more of the display frames may include all or a portion of the textured/rendered image.

Figure 3:
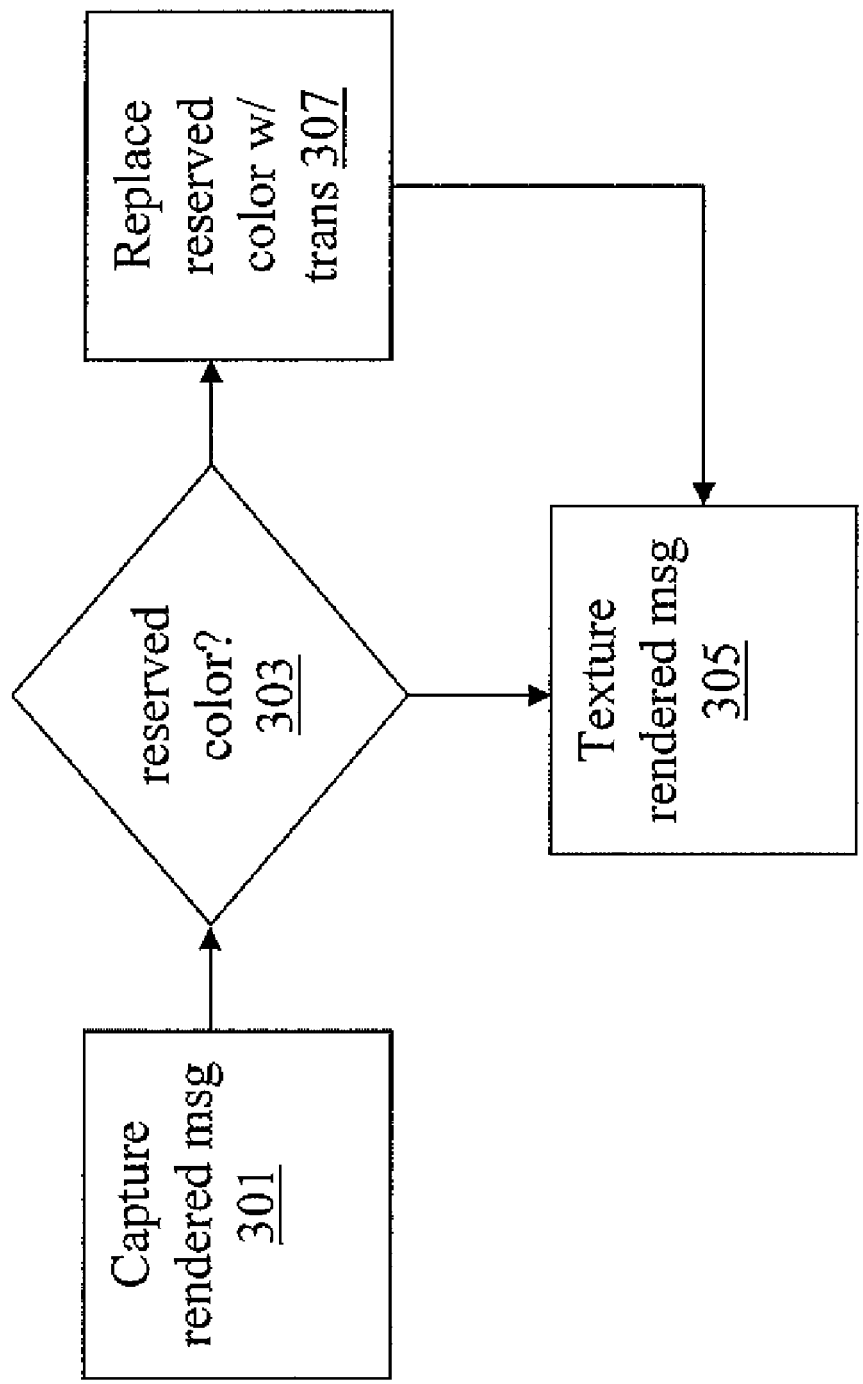
FIG. 3 illustrates a method for texturing and rendering message graphics with transparency according to embodiments.

FIG. 3 illustrates a method for texturing and rendering message graphics with transparency according to embodiments. The process may begin when a second rendering module—such as for example second rendering module 119 of FIG. 1—captures a non-displayed virtually-rendered image such as, for example, non-displayed image 129 of FIG. 1, block 301. The second rendering module may then determine whether any pixels of the non-displayed virtually-rendered image are a reserved color block 303. In embodiments, any color can be designated as a reserved color. If no reserved color is found in any pixel, the non-displayed virtually-rendered image is textured onto an object of a 2D display environment block 305. If one or more pixels contain the reserved color, then the reserve-colored pixels are replaced with a transparent pixel block 307. Next, the display application may move to block 305 and texture the virtually-rendered image onto a surface of an object of the display environment with the transparent pixels included. Where there are transparent pixels included, graphical details such as pixel colors on the surface of the object may be viewable "behind" the transparent pixels of the textured image.

Figure 4:
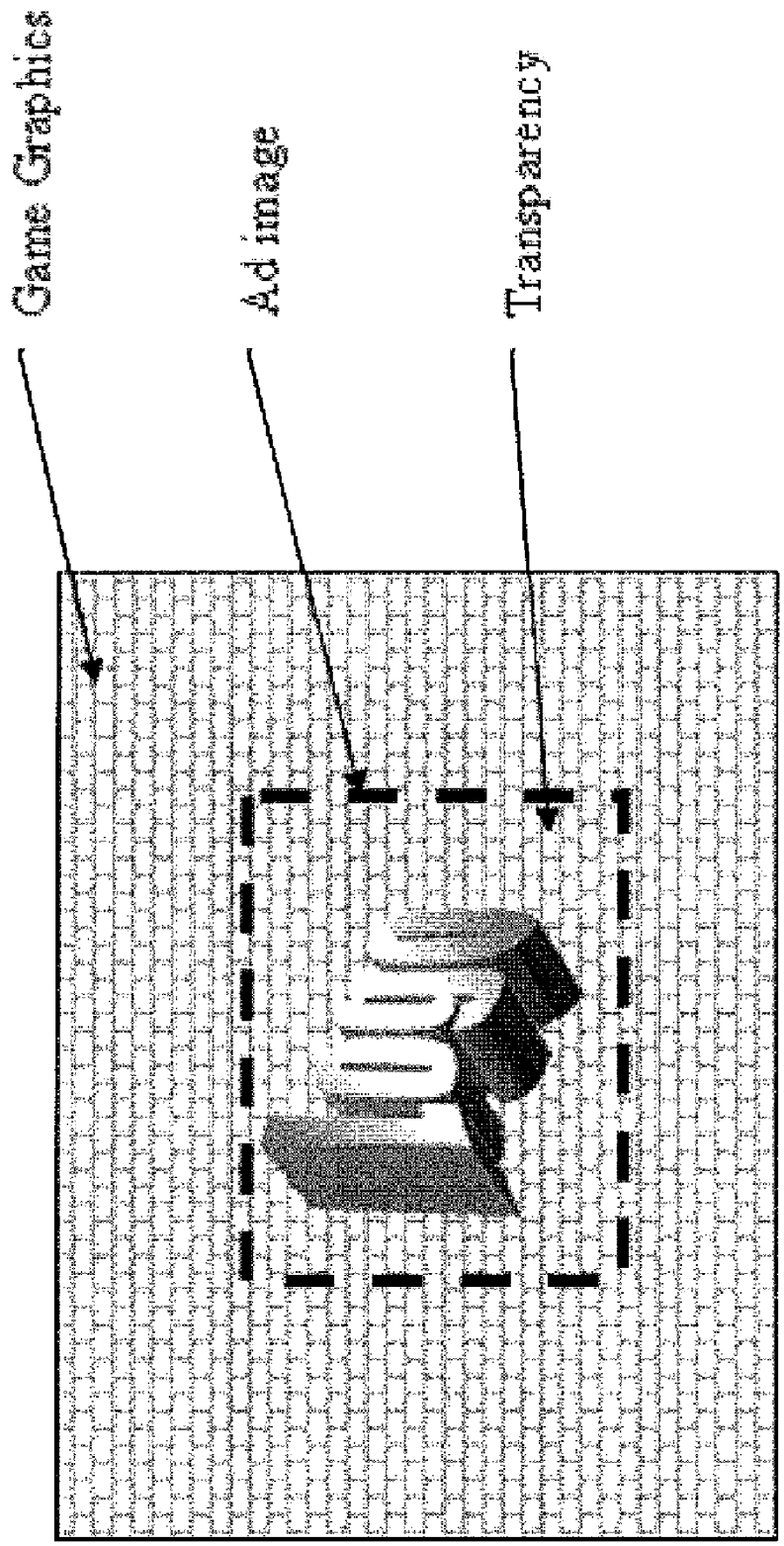
FIG. 4 illustrates an exemplary message graphic rendered with transparency according to embodiments.

FIG. 4 illustrates an exemplary message graphic rendered with transparency according to embodiments. As can be seen, the "brick" pattern is viewable beneath many pixels of the "ad image". Although the image is described as an "ad image", embodiments are not limited to displaying only advertisement messages; other message types may be displayed using the methods, systems, and apparatuses described herein without departing from the scope of embodiments.

In embodiments, translucency may be added to the virtually-rendered image when it is textured to the 3D object of the display environment. In embodiments, translucency may be used for a number of effects. For example, a smooth transition from an opaque message graphic to a transparent area around the message graphic may be accomplished by using a small gradient of changing translucency. This may result in a message graphic with a smooth, soft border. Existing HTML format does not support a per-pixel translucency value (also referred to as 'alpha').

Figure 5:
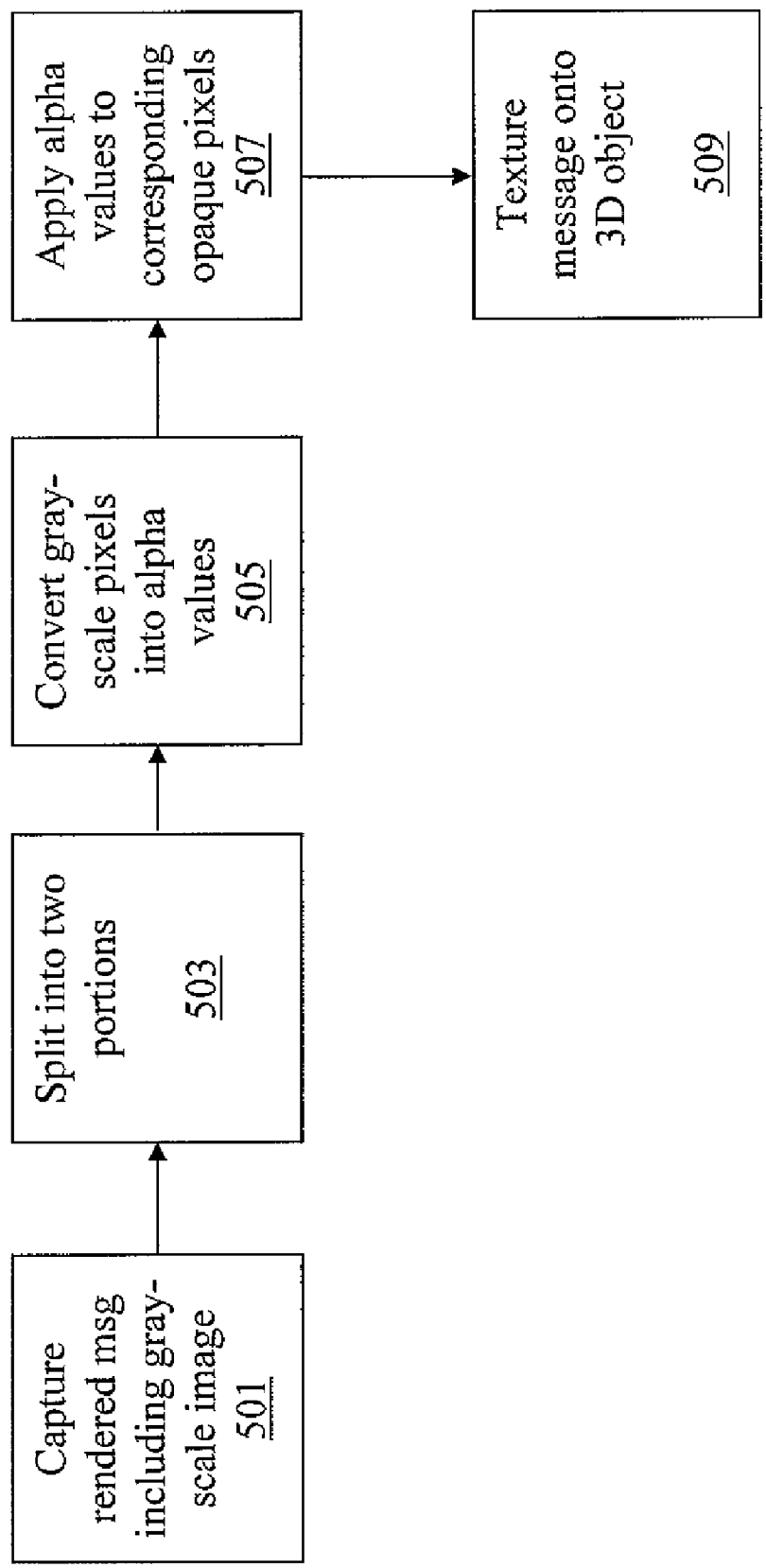
FIG. 5 illustrates a method for rendering and texturing message graphics with translucency using a gray-scale alpha-map according to embodiments.

FIG. 5 illustrates a method for rendering message graphics with translucency using a gray-scale alpha-map according to embodiments. The process may begin when a second rendering module—such as for example second rendering module 119 of FIG. 1—captures a virtually-rendered non-displayed image—such as for example virtually-rendered non-displayed image 129 of FIG. 1—including two message graphics block 501. In embodiments, one message graphic may be an opaque message graphic while the other may be a gray-scale message graphic, including gray-scale pixels. Next, the second rendering module may split the virtually-rendered non-displayed image into two portions, each portion corresponding to one of the message graphics block 503. Second rendering module may then convert each gray-scale pixel of the gray-scale message graphic into an alpha value according to some algorithm block 505. The second rendering module may then apply the corresponding alpha values to each pixel of the opaque image block 507 before texturing the object onto a 3D object of a display environment—such as for example display environment 113 of FIG. 1—block 509. In embodiments, transparency may also be added to the textured image using either the process described earlier, or another process.

Figure 6:
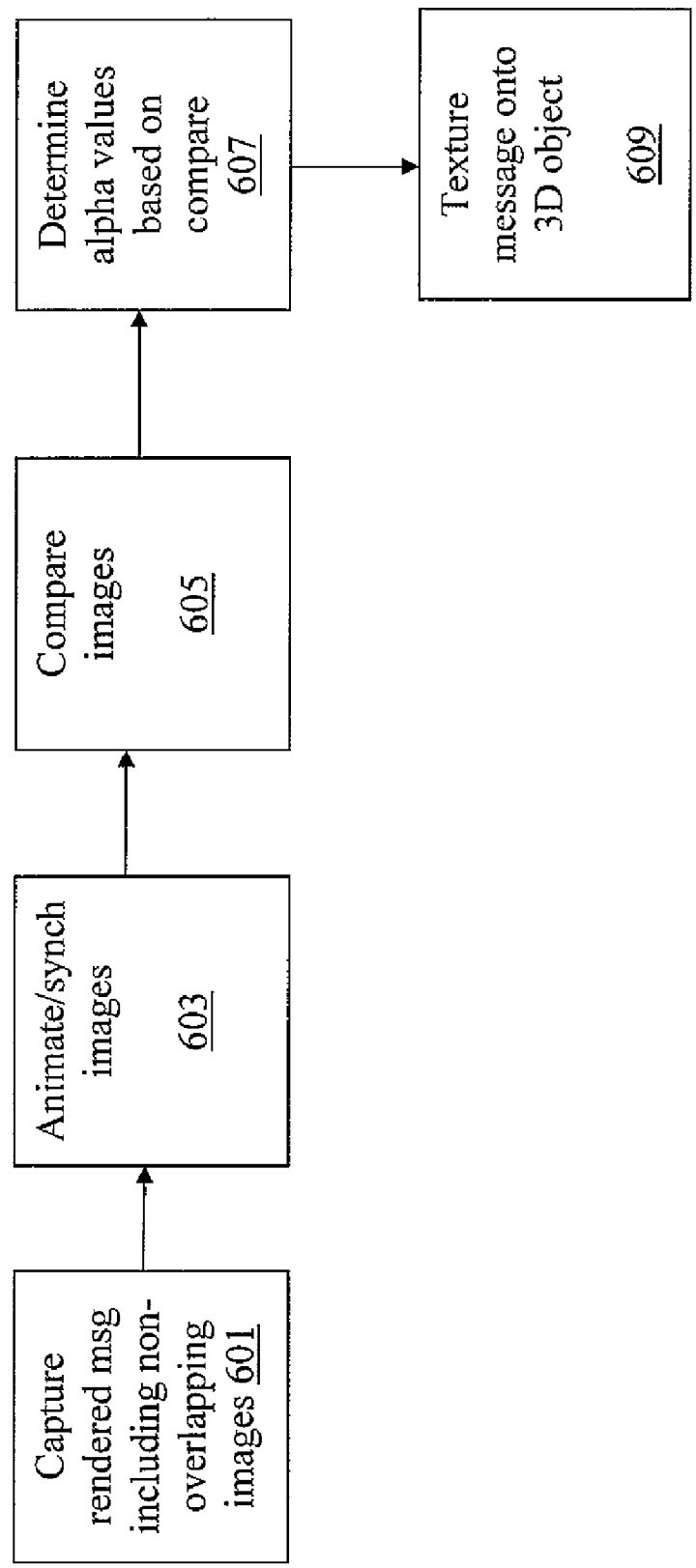
FIG. 6 illustrates a method for rendering and texturing message graphics with translucency using differential alpha according to embodiments.

It may be impractical in embodiments to generate a gray scale alpha map for an advertisement. FIG. 6 illustrates a method for texturing image graphics with translucency using differential alpha according to embodiments. In embodiments, this technique may be used if the ad graphics contain embedded or algorithmic translucency, and/or if the ad is animated (using for example Flash, a video file, or DHTML).

The process may begin when a second rendering module—such as for example second rendering module 119 of FIG. 1—captures a virtually-rendered non-displayed image—such as for example virtually-rendered non-displayed image 129 of FIG. 1—including two non-overlapping message graphics with different background colors block 601. In embodiments, the virtually-rendered non-displayed image may have been virtually rendered from a message formatted with markup language for display on a 2D window. In embodiments utilizing graphic animation, the two ad graphic images may then be synchronized so that they animate together block 603. The resulting virtually-rendered non-displayed image with the non-overlapping graphics may be processed, comparing each of the two corresponding pixels from each graphic block 605. In embodiments, this comparison processing may determine the amount of translucency for each pixel by determining how much of the background color appears in each pixel of both graphics block 607. The background colors may theoretically be any color, provided that they are different from each other. Embodiments using very different colors—such as for example black and white—may simplify the math and yield better results than embodiments using colors that are less different from one another. Once alpha values are obtained for each pixel, the image may be textured onto a 3D object of a display environment using the corresponding determined alpha values for each pixel of the image to create translucency block 609.

In alternate embodiments where the virtually-rendered non-displayed image contains only one graphic, a similar technique may be employed by changing the background color, re-rendering the received message with the new background color, and comparing the virtual re-rendered image with the new background color to the earlier-virtually-rendered image with the old background color. In embodiments, this may be accomplished by causing a first rendering module—such as for example first rendering module 117 of FIG. 1—to re-virtually render the received message formatted in markup language for display within a 2D window with a different background color (e.g. with a different HTML background color).

Markup language formats—for example HTML—may allow for user input. User input may include, for example, information about the positioning of the mouse cursor, clicks from the mouse, and any keys pressed on the keyboard. Since processing of pointing device user input may be based on a 2D plane of the display surface—such as for example display screen 135 of FIG. 1—it may be necessary to convert on-screen pointing device input information to a coordinate system relative to the virtually-rendered image so that user input can be processed as if the user were interacting directly with a 2D version of the virtually-rendered image. This conversion may be, in embodiments, arbitrarily complex such as, for example, where the HTML content is textured onto a fabric surface of a flapping flag in a 3D scene. Since the value of an advertisement may be in clarity and visibility, a more desirable surface for an ad may be a flat surface that may allow for a clear viewing of the ad. In embodiments, such coordinate conversion may need to take place rapidly as the on-screen image changes its position and/or angle or when the on-screen image becomes partially or wholly blocked by other objects or moves out of view.

Figure 7:
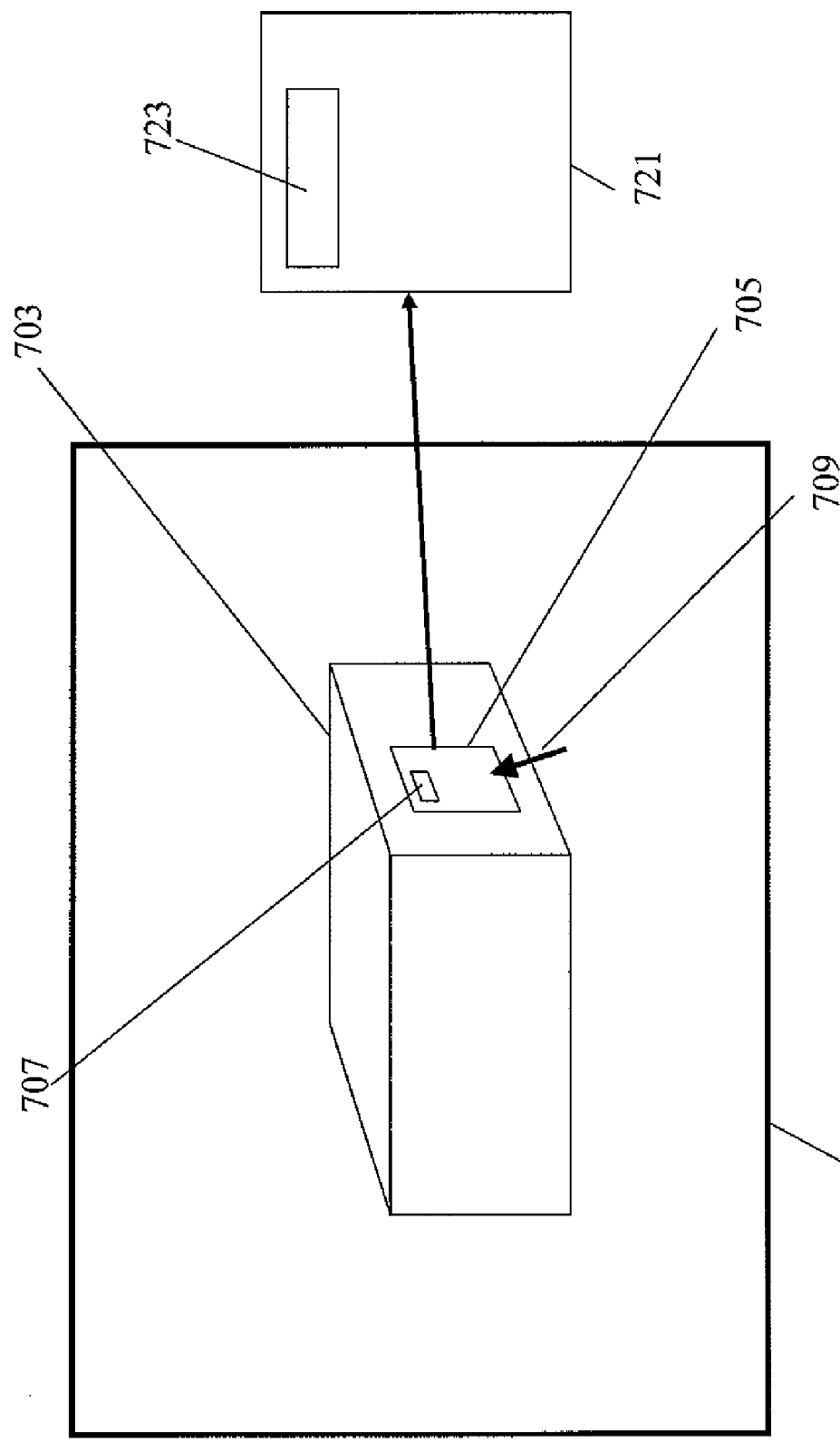
FIG. 7 illustrates a message textured onto an on-screen 3D object in a display environment and on-screen pointer coordinate mapping to corresponding coordinates of a non-displayed virtually-rendered message stored in memory according to embodiments.

FIG. 7 illustrates a 2D image textured onto a 3D object in a display environment with an on-screen pointer coordinate conversion to a coordinate system of a virtually-rendered image according to embodiments. Display screen 701 may include 3D object 703 with on-screen image 705 on a surface of object 703. A display application—such as for example display application 111 of FIG. 1—may be configured to texture virtually-rendered non-displayed image 721 as on-screen image 705 on the surface of object 703. On-screen image 705 may correspond with virtually-rendered non-displayed image 721 stored in system memory or elsewhere. In embodiments, virtually-rendered non-displayed image 721 may correspond to an originally-virtually-rendered image, formatted in markup language for display in a 2D window—such as virtually-rendered non-displayed image 129 of FIG. 1—or a facsimile thereof generated for the purposes of converting input device information to a coordinate system of the virtually-rendered image.

On-screen image 705 may include user input field 707 corresponding to user input field 723. In various embodiments, user input field 707, as well as corresponding user input field 723, may be a clickable link, control button, text-entry field, or other control. Embodiments are not limited to any particular types of user input fields. Also displayed on display screen 701 may be on-screen pointer 709 controlled by a pointing device—such as pointing device 105 of FIG. 1.

The display application may be configured to convert an on-screen coordinate system of display screen 701 to a coordinate system of virtually-rendered non-displayed image 721 to facilitate computing whether on-screen pointer 709 currently points to user input field 707 of on-screen image 705. In embodiments, each grid or section of the on-screen coordinate system may be composed of one or more pixels. In embodiments, each grid or section of virtually-rendered non-displayed image 721 may be composed of one or more pixels.

In embodiments, computing the position of on-screen pointer 709 relative to on-screen image 705 may involve mathematically constructing a virtual line from a virtual "camera" used to render the display on display screen 701 through a screen pixel that on-screen pointer 709 may be pointing to. This line may be virtually projected into the 3D display and an intersection with the plane of on-screen image 705 may be computed. In embodiments, operating system messages containing original pointer coordinate information may be intercepted, converted, and passed to operating system controls, such as for example the MSHTML control in embodiments where the operating system is one of various Microsoft Windows operating systems.

Figure 9:
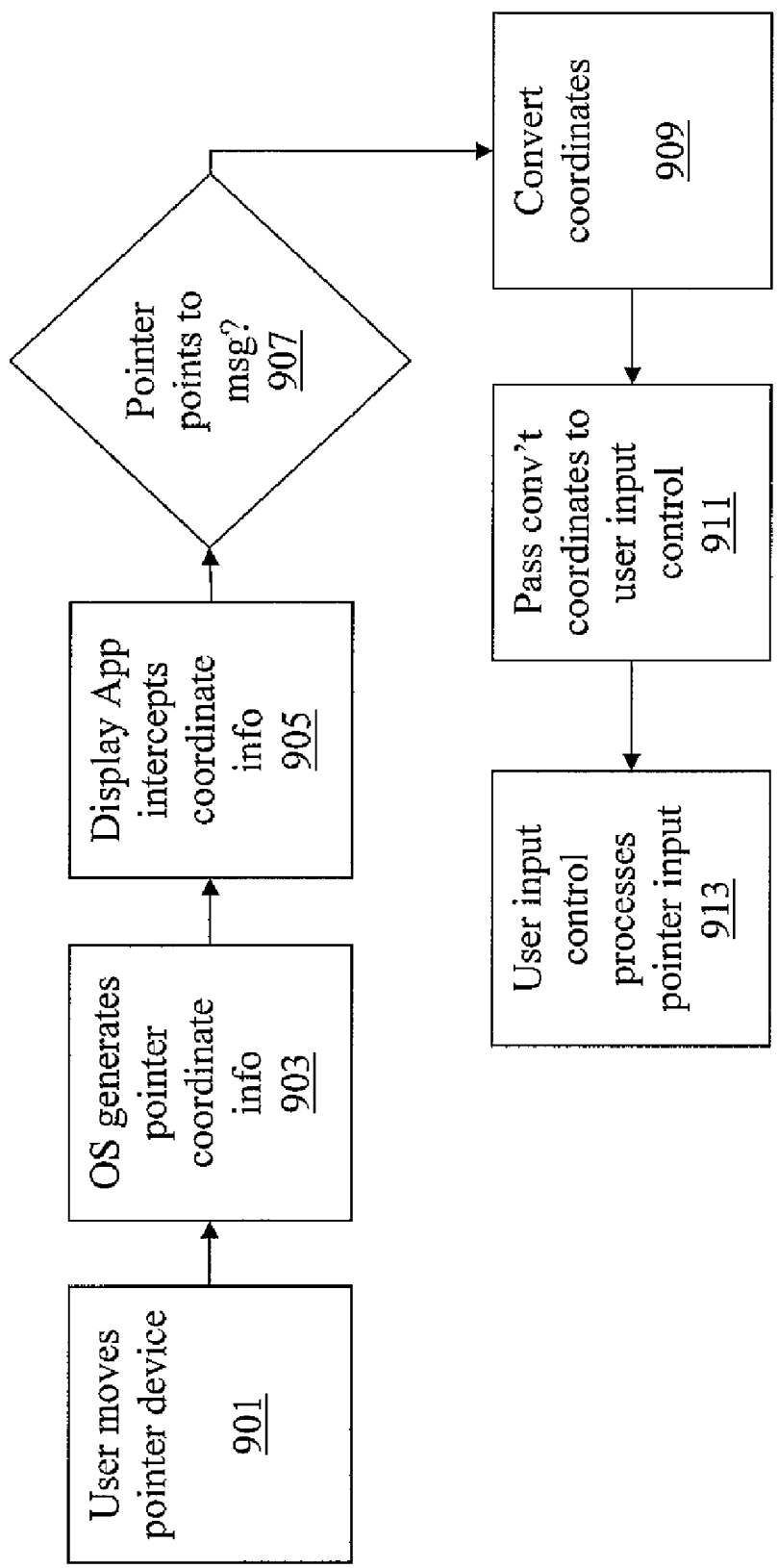
FIG. 9 illustrates a method for converting intercepted on-screen pointer coordinate information to a coordinate system of a virtually-rendered non-displayed image according to embodiments.

FIG. 9 illustrates a method for converting intercepted on-screen pointer coordinate information to a coordinate system of a virtually-rendered non-displayed image according to embodiments. The process begins when a user uses the pointer generating pointing device input block 901. An operating system may then generate pointer coordinate information block 903. The display application may intercept the operating system message (or other message) containing pointer coordinate information block 905. The display application may be configured to determine whether an on-screen pointer—such as on-screen pointer 709 of FIG. 7—points to a textured on-screen image—such as on-screen image 705 of FIG. 7—by computing as described above the relative position of the on-screen pointer to the textured on-screen image block 907. If it does, the display application may then convert the intercepted pointer coordinate information to coordinate information corresponding to a virtually-rendered non-displayed image—such as virtually-rendered non-displayed image 721 of FIG. 7—block 909. The display application may then pass the converted coordinate information to a user input control—such as an operating system control or other—associated with accepting user input into the virtually-rendered non-displayed image block 911. In embodiments, the user input control may accept and process the converted pointing device coordinate information as if the user were interacting directly with the virtually-rendered non-displayed image block 913. In this way, existing controls may be utilized when messages formatted in markup language for display in a 2D window are textured onto 3D objects of a 2D display environment and displayed on-screen.

In another example referring back to FIG. 7, user input field 707—and user input field 723—may be a clickable link. A user "click" over user input field 707 may be converted to a "click" onto user input field 723—using the process described above—which may then be passed to user input controls. In this example, the user input controls may then activate the link and launch a browser window and load an information page corresponding to the clickable link, just as if the user had clicked on the clickable link of virtually-rendered non-displayed image 721.

In embodiments, keyboard input may also require conversion. The information associated with a key being pressed on the keyboard is traditionally routed to and directly used by software running on the computer. In computing systems employing graphical user interfaces, including browsers configured to render markup languages such as HTML, multiple applications may be concurrently running and the computing system may have to select which application should receive the appropriate keyboard input. The selected application may be said to be currently receiving "Keyboard Focus". Keyboard focus within images formatted in markup language may be controlled with a variety of techniques, including a mouse click on a text-entry field to select that field to receive keyboard focus. Since embodiments may employ HTML or other markup language which are designed for on-screen display, these embodiments may rely on the use of keyboard focus, and may include user input fields which expect keyboard information and which may require the proper application of keyboard focus.

Keyboard focus may be provided by an operating system (such as, for example, any of the various Windows operating systems) of a computing system which may be configured to provide keyboard focus only to on-screen elements. However, user input fields of a virtually-rendered non-displayed image—such as virtually-rendered non-displayed image 721 of FIG. 7—may not be displayed on screen. As such, an alternate provision of keyboard focus and/or input may be required in embodiments. In embodiments, an environmental keyboard focus module may be embedded into the received message formatted in markup language for display in a 2D window to maintain a keyboard focus that may be separate from the keyboard focus maintained by the operating system. Such environmental keyboard focus module may be, in embodiments JavaScript or other. In embodiments, this additional software code may be configured to track on-screen pointer and keyboard input information directed to textured/rendered image(s) displayed on a display screen—such as for example on-screen image 705 of FIG. 7—and keep track of which user input field—such as for example user input field 723 of FIG. 7—should receive keyboard focus. The embedded environmental keyboard focus module may then route the tracked focus information to a message keyboard focus module—such as an operating system keyboard focus module or other—configured to accept and process keyboard input for messages formatted in markup language for display on 2D window. Thus, the keyboard input may be processed by the message keyboard focus module, in embodiments, as if the user had interacted directly with the user input field 723 of FIG. 7 or other user input field of a virtually-rendered non-displayed image. In embodiments, tracking on-screen pointer information to determine keyboard focus may be accomplished using the method illustrated in FIG. 9 or other method.

Because embodiments of the present invention may use existing web-page infrastructure to display messages such as web-based advertisements, the metrics and tracking processes that exist in the current web-page advertising infrastructure may also be used. This may make it convenient for advertisement sales and accounting, since it may be non-disruptive to current web-page advertising infrastructure. As a result people already familiar with web-page advertising may understand how to apply their existing economic models and technology to the new use.

There may be existent inaccuracies in the current metrics and tracking model used for tracking the display of messages in a browser, such as web-page advertising. An example may be an advertisement sent to a user as a part of the web-page, but that the user doesn't see for various reasons including, for example, that the advertisement is not in a part of the web-page immediately visible to the user and the user never scrolls to view it. In this case, the server that supplied the advertisement may note that the ad was sent (an 'impression') but there is no good way to know that it has actually been viewed, or that it was viewable.

Similar inaccuracies may arise when placing web-page messages, such as advertisements, into audio-visual applications such as computer-implemented games. As an example only, a virtually-rendered advertisement message may be textured onto a surface of a 3D building (e.g. a 3D object) within the game's display environment. During the game, the player's viewing angle may never intersect that surface of the building. As a result, the game may never generate display frames for display on a viewing device including the textured advertisement. In such embodiments utilizing traditional web-page advertisement tracking models, the retrieval of the advertisement message and/or the message graphics may count as an "impression" even though the advertisement message was never visible to the user, making the "impression" less valuable as a metric.

To provide greater accuracy in advertising metrics, may supplement the existing server-based web-page advertisement metrics and tracking with detailed accurate client viewability information. More information regarding detailed client viewing information may be found in U.S. application Ser. No. 11/317,875 filed Nov. 22, 2005 and entitled "Object Placement Within Computer Generated Multidimensional Environments", the entire contents of which are hereby incorporated by reference. Such client viewing information may be collected and sent back to tracking databases with a great amount of detail. To keep the reporting data sizes relatively small and manageable, it may be advantageous to create a summarized quality histogram, and return the histogram instead.

A number of specific metrics may be tracked for each textured/rendered message. Metrics may include, for example, information about the size of the message, a relative 3D alignment of the message to the viewing screen, the percentage and/or portion of the message that is visible, a time the message was visible, whether or not the message was visible to the user, and others. Each specific metric may be given a value rating. As an example only, values between 0 and 1 may be used where 0 may be considered, for example, the worst possible quality and 1 may be considered, for example, the best possible quality. There may be individual adjustable parameters to determine how each viewing metric may be scaled into this range or another range. In embodiments, each display frame created by the display application may be analyzed and the individual value ratings for each metric textured/rendered message may be combined into a single quality value corresponding to each metric. In embodiments, the resulting quality value may be used, for example, to contribute to the appropriate column in a histogram of quality values.

In embodiments, there may be any number of columns in the histogram such as, for example, five. In embodiments, five columns may provide a good range of values without generating a large amount of data. In embodiments, there may be a different and separate histogram for each rendered/textured message so that quality values may be maintained separately for each message.

In embodiments, each column of the histogram may also include or incorporate the total amount of time that the measured message quality value rating was measured. In embodiments, each display frame's contribution to a histogram's quality value may be the addition of time that a particular quality value was measured.

The collected value ratings and/or histograms may be transmitted back to a tracking collection server either during or after execution of the display application. In embodiments where the display application is a computer-implemented game, during game play, after game play finishes, or when the user closes the game executable. The transmission may include, for example, identification information for the game that was being played, a total count of all the messages referenced by the display application, as well as information for each message and message placement referenced by the display application. The per-message information may include the histogram and a locator reference—such as a URL or other locator—used to access the message. This locator reference may be utilized by existing message-tracking infrastructure to uniquely identify a specific message. In embodiments, this locator reference may allow the metrics information to be associated with the message and to supplement the impression count statistics accumulated by the message server for that message.

The collected metrics information may be transmitted directly, or it may be cached locally on the client device. In embodiments, a shared cache accessible by multiple display applications—such as, for example, multiple games—may be used. If, for some reason, the display application is unable to transmit the information back to the tracking collection server, other display application(s) that may also be included on the client device may transmit the cached data. In embodiments, if a display application is unable to transmit the information, it may be configured to transmit the cached information the next time it executes. Using a cached approach may allow a high eventual success rate for returning the collected metrics information without requiring an additional executable or process to transmit the data. Not utilizing an additional executable or process to transmit the cached data may alleviate security concerns.

Figure 8:
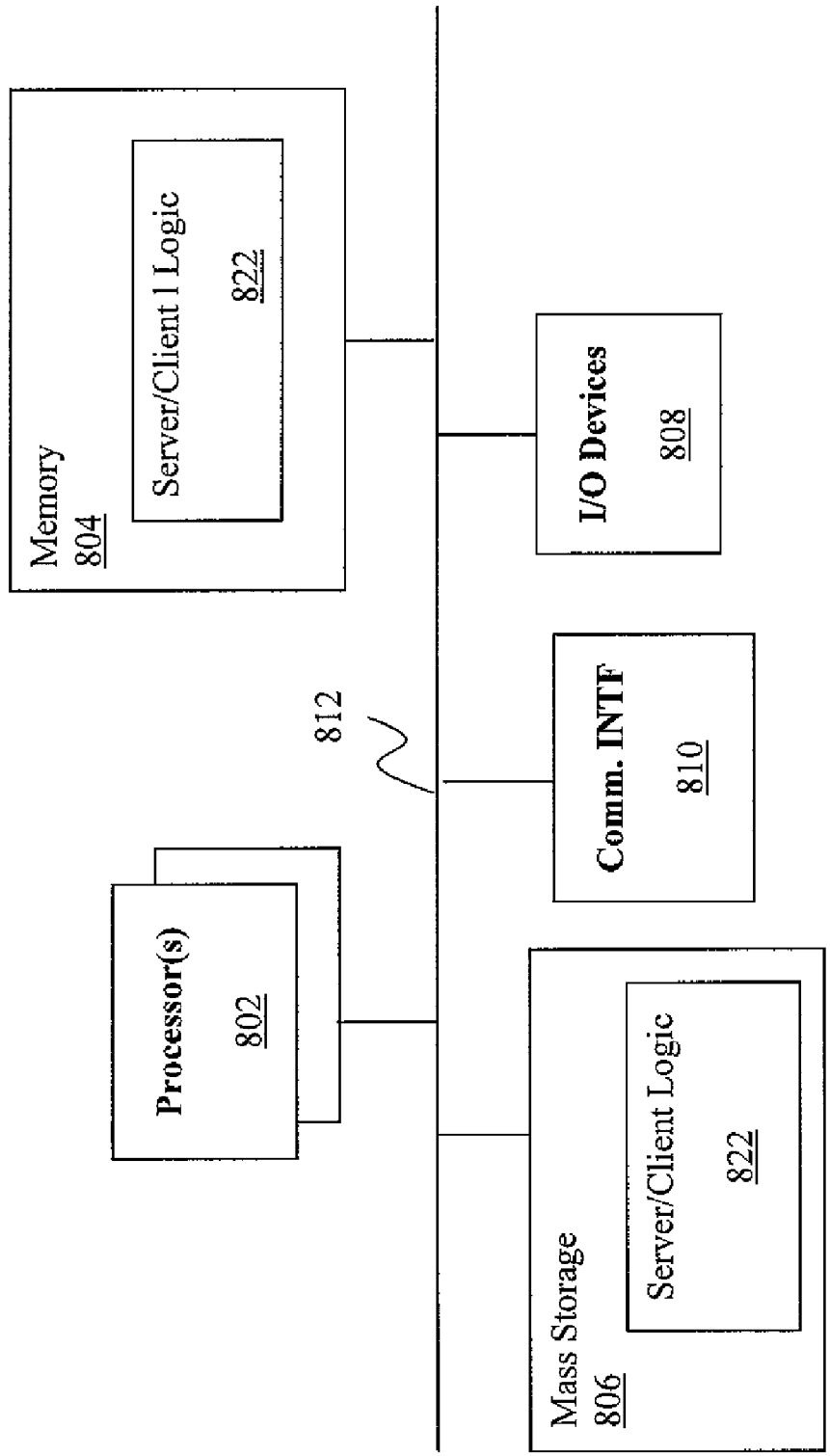
FIG. 8 illustrates an example computer system suitable for use to practice aspects of various embodiments of the present invention.

FIG. 8 illustrates an example computer system suitable for use to practice aspects of various embodiments. As shown, computing system/device 800 includes one or more processors 802 and system memory 804. Additionally, computing system/device 800 includes mass storage devices 806 (such as diskette, hard drive, CDROM and so forth), input/output devices 808 (such as keyboard, pointing device, cursor control and so forth) and communication interfaces 810 (such as network interface cards, modems and so forth). The elements are coupled to each other via system bus 812, which represents one or more buses. In the case of multiple buses, they are bridged by one or more bus bridges (not shown).

Each of these elements performs its conventional functions known in the art. In particular, system memory 804 and mass storage 806 may be employed to store a working copy and a permanent copy of the programming instructions implementing one or more aspects of the above described teachings to practice selected embodiments of the present invention. The programming instructions may also implement other related functions. For example, in the case of computing system/device 800 being used as a client device 102 of FIG. 1, the programming instructions may also implement telephony, PIM applications and so forth. When computing system/device 800 is being used as a server, the programming instructions may also implement accounting and other ad services related functions. The programming instructions may be implemented in assembler instructions supported by processor(s) 802 or high level languages, such as C or Java, that can be compiled into such instructions, or instructions for a virtual machine (VM) operating on the processor(s), memory, and software systems of the computing system/device.

The permanent copy of the programming instructions may be placed into permanent storage 806 in the factory, or in the field, through e.g. a distribution medium (not shown) or through communication interface 810 (from a distribution server (not shown)). The constitution of these elements 802-812 are known, and accordingly will not be further described.

Embodiments may include personal data assistants (PDA), hand-held gaming devices, gaming consoles, portable music players, cellular telephones, computer systems, etc.

The display of advertising in a computer-implemented game may be useful for generating revenue via the sale of the advertisements, but this may not be ideal for a game player. If the game meets certain criteria, it may be advantageous to avoid showing advertising. These criteria often depend on, for example, the current state of the game license to the end user. If the game is being played without cost to the player, for example, then showing advertisements or other messages may be more appropriate than if the game has been purchased (i.e. the game is fully-licensed) by the end user. The management of the current state of the game license and the associated end user rights may be referred to as DRM (Digital Rights Management). The DRM for a game may be more complex than a simple 'paid for' or 'not paid for'. DRM may involve, for example, games available for play via subscription, games paid for via the use of tokens or coupons, games paid for by a third party sponsor, and games that may be free for a limited time, or for a limited number of plays, but may need to be purchased (using any number of possible techniques) to continue play.

In embodiments of the present invention, in-game advertising may be used in conjunction with various DRM systems to provide control over what advertising may be shown in the various possible states of licensing.

Ad-blocking software is growing in popularity. Ad-blocking software intercepts the various web-page requests made by a computer and fails those requests if they are directed towards any of a predefined set of servers that are identified as serving web-based advertisements.

Since embodiments of the present invention may use existing advertisement serving infrastructure and existing advertisement servers, it may be subject to having advertisements blocked by ad-blocking software. Because games that have in-game advertising may have ad placements throughout a 3D environment, there may be blank spots in the environment if those ads are blocked, which may have a negative effect on the look and feel of the game.

Embodiments may use two or more ways to avoid allowing ad blockers to have a negative impact to the game. The first way may be to detect when an advertisement is blocked by checking to see if the image of the advertisement is blank. If the advertisement is blank, the fallback offline ad (as described previously) may be used instead. The second way may be to cache advertisements in the message server (e.g. message server 181 of FIG. 1), and modify the received markup documents to include locator references (e.g. URLs) pointing to the message server in the place of a locator reference to the graphics server (e.g. graphics server 161 of FIG. 1) or a separate server. Then, the game may retrieve the cached advertisements and/or graphics from the message server rather than the graphics server. This may also provide a technique to serve advertisements if there is a network or server error, or if the client computer is for some reason without network access.

In embodiments, the message server may be in the same network domain as servers that may be required for communications to purchase or license the game such as, for example, the digital rights management (DRM) infrastructure. In such embodiments, it may not be productive for an end user to block the message server as a source of online advertisements. In embodiments, a fully purchased version of the game may not require the access to these servers. In embodiments, a fully purchased game may or may not display messages or advertisements.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   receiving or retrieving, by a first rendering module of a computing device, markup data associated with a message formatted for two-dimensional (2D) rendering;
   virtually rendering, by the first rendering module of the computing device, the message in a non-displayed image in accordance with the markup data; and
   rendering, by a second rendering module of the computing device, a three-dimensional (3D) object in a 2D display environment including texturing the non-displayed image on a surface of the 3D object to render the message;
   wherein texturing comprises adding transparency and/or translucency to the rendered message such that, when the 3D object is rendered, graphical details of the 3D object are visible through transparent and/or translucent pixels in the non-displayed image.

2. The method of claim 1 wherein the first rendering module is configured to cooperate with a destination module and the method further comprises emulating, by the second rendering module, the destination module and capturing, by the second rendering module, the non-displayed image upon said virtually rendering.

3. The method of claim 2 wherein the destination module is a print module.

4. The method of claim 1 wherein the markup data is in one of HTML format, XML format, or XHTML format.

5. The method of claim 4 wherein the markup data references an image file and the virtually rendering comprises retrieving the referenced image file.

6. The method of claim 1 wherein the adding transparency includes converting one or more reserved color pixels of the non-displayed image to one or more transparent pixels.

7. The method of claim 1 wherein the adding translucency comprises:
   comparing each of a first plurality of pixels of a first portion of the non-displayed image to each of a second plurality of pixels of a second portion of the non-displayed image, the first and second portions each comprising a graphical image, the first portion rendered on a first background color and the second portion rendered on a second background color, said comparing comprising ascertaining an amount of the first background color in each pixel of the first plurality of pixels and an amount of the second background color in each pixel of the second plurality of pixels; and
   determining alpha values for each pixel of the rendered message based on said comparing.

8. The method of claim 1 wherein the adding translucency comprises using a plurality of gray-scale pixels of a gray-scale alpha-map portion of the non-displayed image to determine a plurality of alpha values to apply to a corresponding plurality of opaque pixels of an opaque portion of the non-displayed image.

9. The method of claim 1 wherein the 2D environment is part of a computer-implemented game.

10. The method of claim 1 wherein the rendered message is an advertisement.

11. The method of claim 1 wherein the rendered message includes one of animation or video.

12. A method comprising:
   virtually rendering, by a first rendering module of a computing device, a message in a non-displayed image;
   rendering, by a second rendering module of the computing device, a three-dimensional 3D object in a 2D display environment including texturing the non-displayed image on a surface of the 3D object to render the message, including adding transparency and/or translucency to the rendered message such that, when the 3D object is rendered, graphical details of the 3D object are visible through transparent and/or translucent pixels in the non-displayed image;
   by a computing device, receiving user input from a user input device; and determining, by an input module of the computing device, that the received input corresponds to a user input field of the rendered message textured on the surface of the 3D object.

13. The method of claim 12 wherein the user input device is a pointing device, the received user input comprises positioning information of the pointing device, and wherein the determining comprises converting the positioning information to a coordinate system of the 2D display environment.

14. The method of claim 13 wherein the determining comprises constructing a line from a virtual camera point used to generate the 2D display environment to a pixel identified by the positioning information and computing whether the constructed line intersects a plane of the user input field.

15. The method of claim 13 further comprising passing the converted positioning information to a control module associated with the rendered message.

16. The method of claim 12 further comprising determining by the input module of the computing device, upon an affirmative determination that the received user input corresponds to the user input field, that the user input field will receive a keyboard focus.

17. The method of claim 16 wherein the input module of the computing device comprises an environmental keyboard focus module and the determining comprises tracking, by the environmental keyboard focus module, keyboard focus information of the 2D display environment, and the method further comprises routing, by the environmental keyboard focus module, the tracked keyboard focus information of the 2D display environment to a message keyboard focus module configured to provide keyboard focus to the rendered message.

18. The method of claim 16 wherein the user input device is a keyboard and the user input is a keystroke.

19. The method of claim 16 wherein the user input device is a pointing device and the received user input is positioning information of the pointer device, and wherein the determining comprises converting the positioning information to a coordinate system of the 2D display environment.

20. A method comprising:
virtually rendering by a first rendering module of a computing device, a message in a non-displayed image;
rendering, by a second rendering module of the computing device, a three-dimensional 3D object in a 2D display environment including texturing the non-displayed image on a surface of the 3D object to render the message, including adding transparency and/or translucency to the rendered message such that, when the 3D object is rendered, graphical details of the 3D object are visible through transparent and/or translucent pixels in the non-displayed image;
tracking, by a tracking module of the computing device, one or more metrics corresponding to a position of the rendered message textured on the 3D object; and
determining, by the tracking module of the computing device, one or more quality values corresponding to a viewability of the rendered message.

21. The method of claim 20 wherein the one or metrics correspond to at least one of: a percentage of the rendered message displayed on a screen, a relative three-dimensional alignment of the rendered message, and an amount of time the rendered message is displayed.

22. The method of claim 20 further comprising transmitting, to a collection server, the one or more quality values.

23. The method of claim 20 wherein the determining comprises generating a histogram of the one or more quality values.

* * * * *